Figure 6:
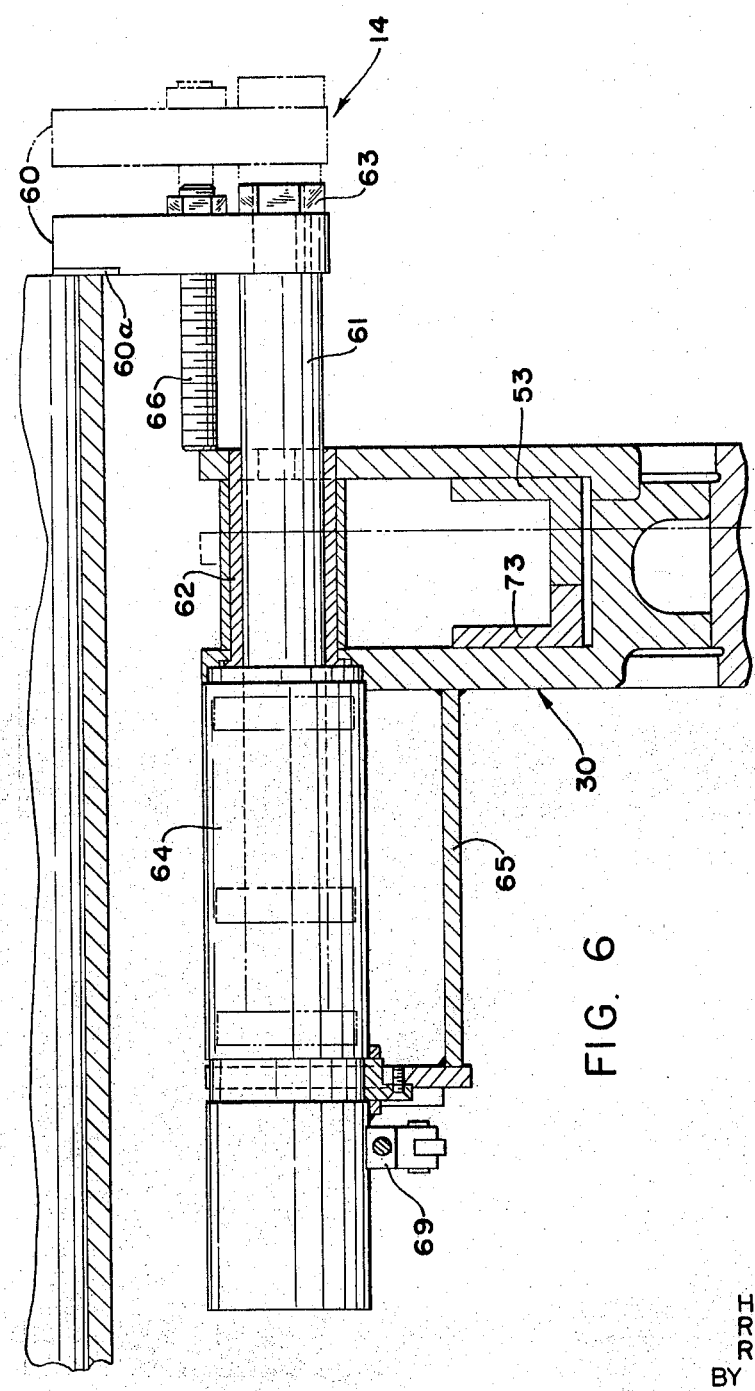

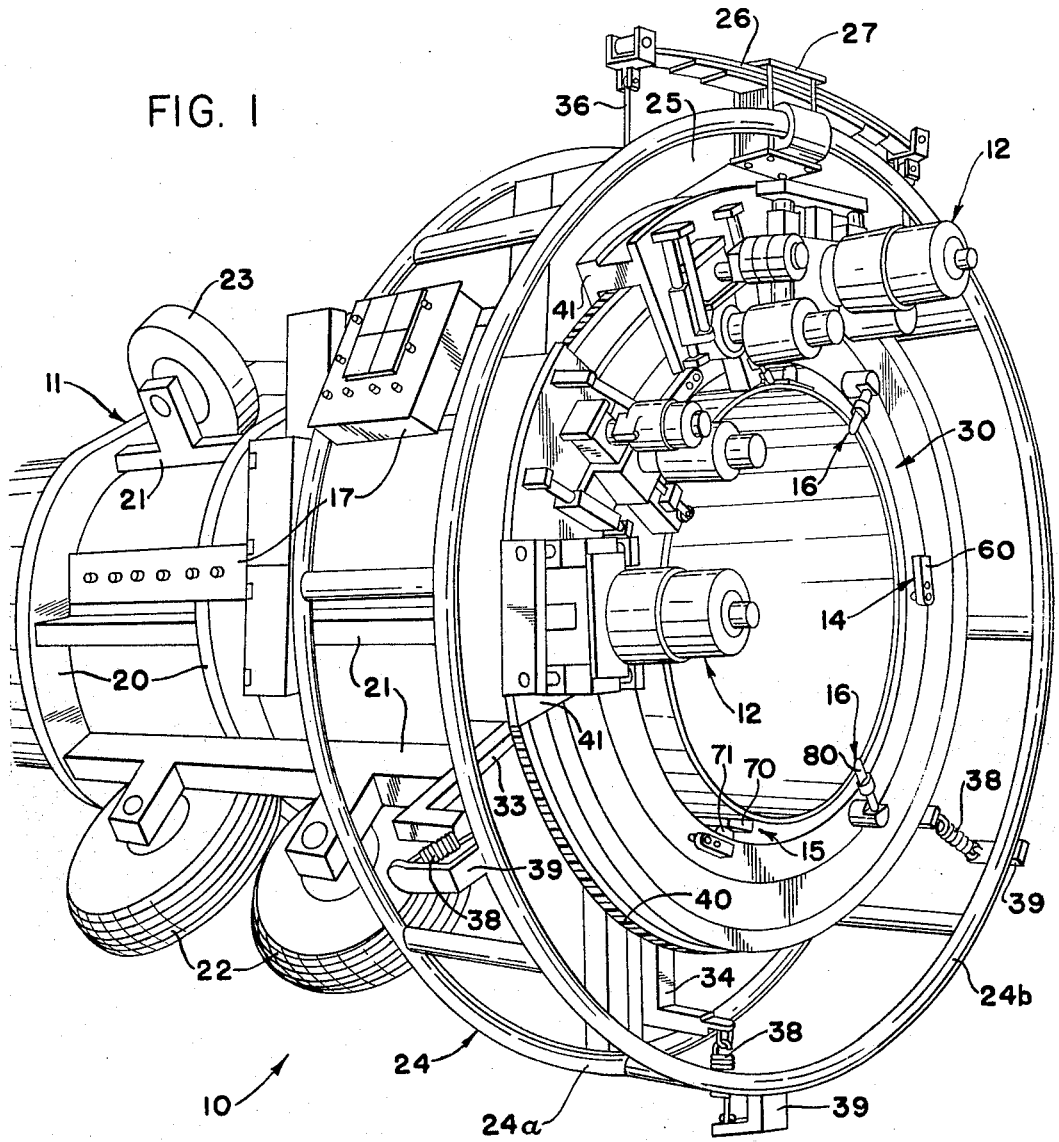

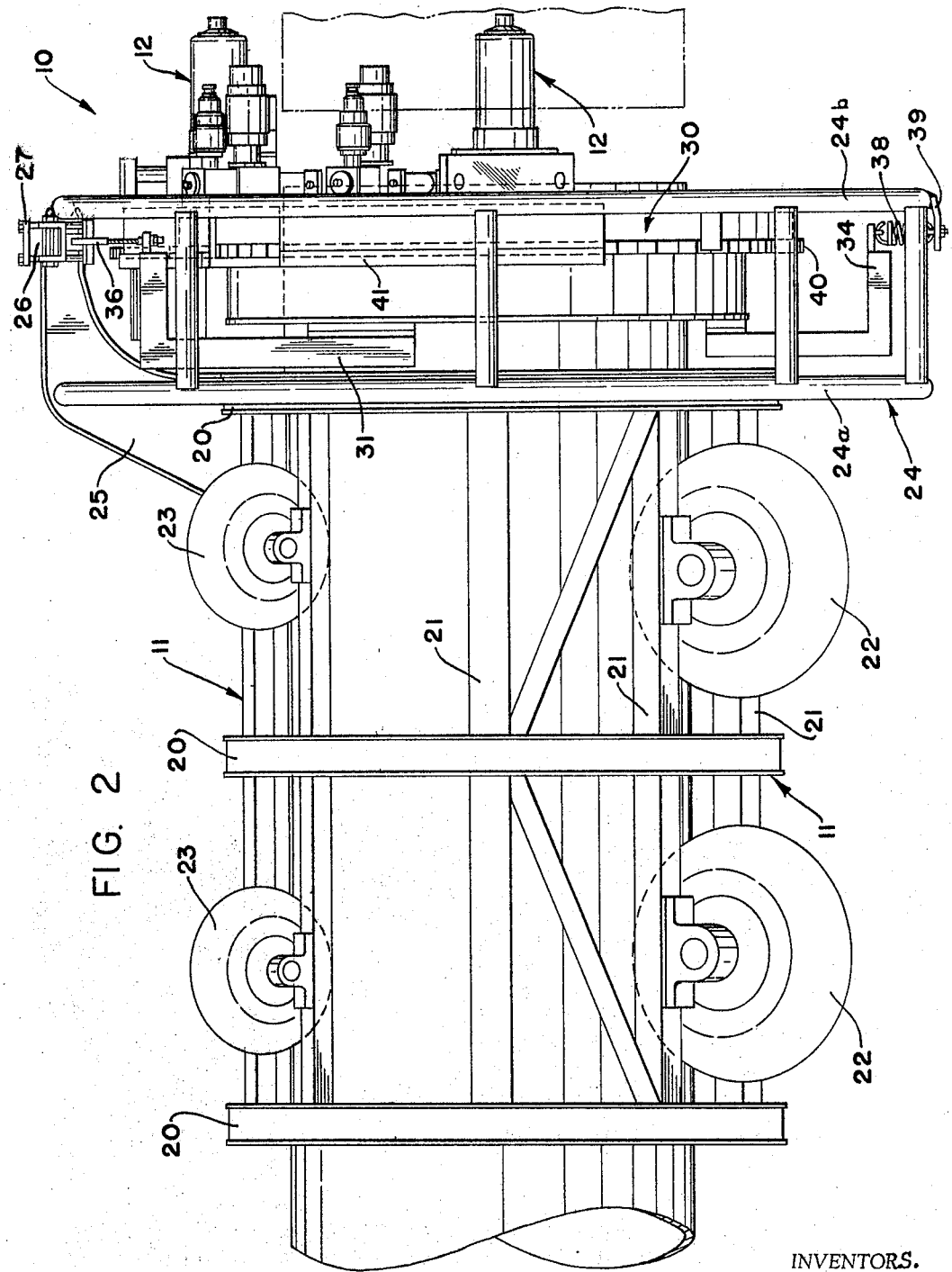

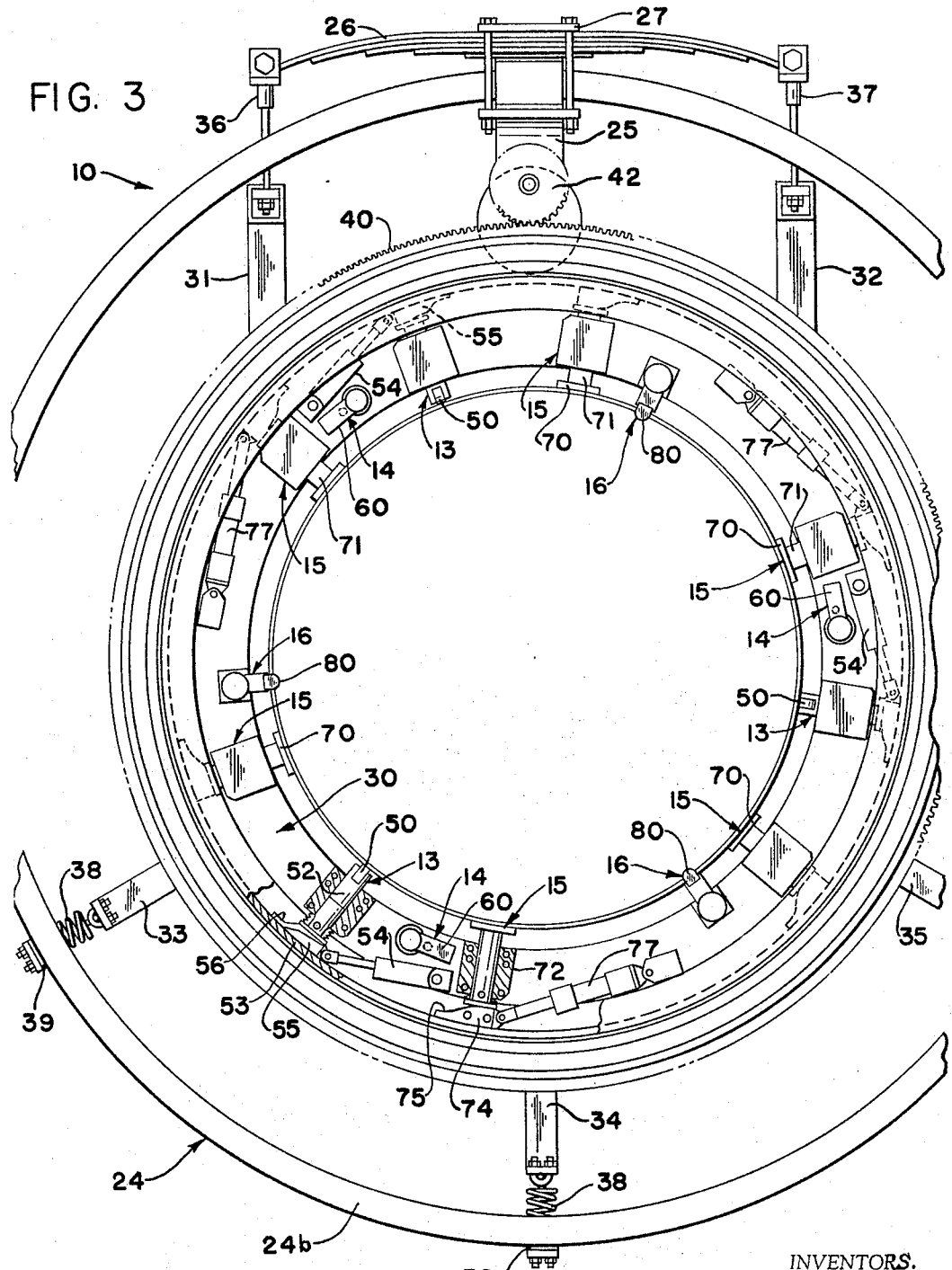

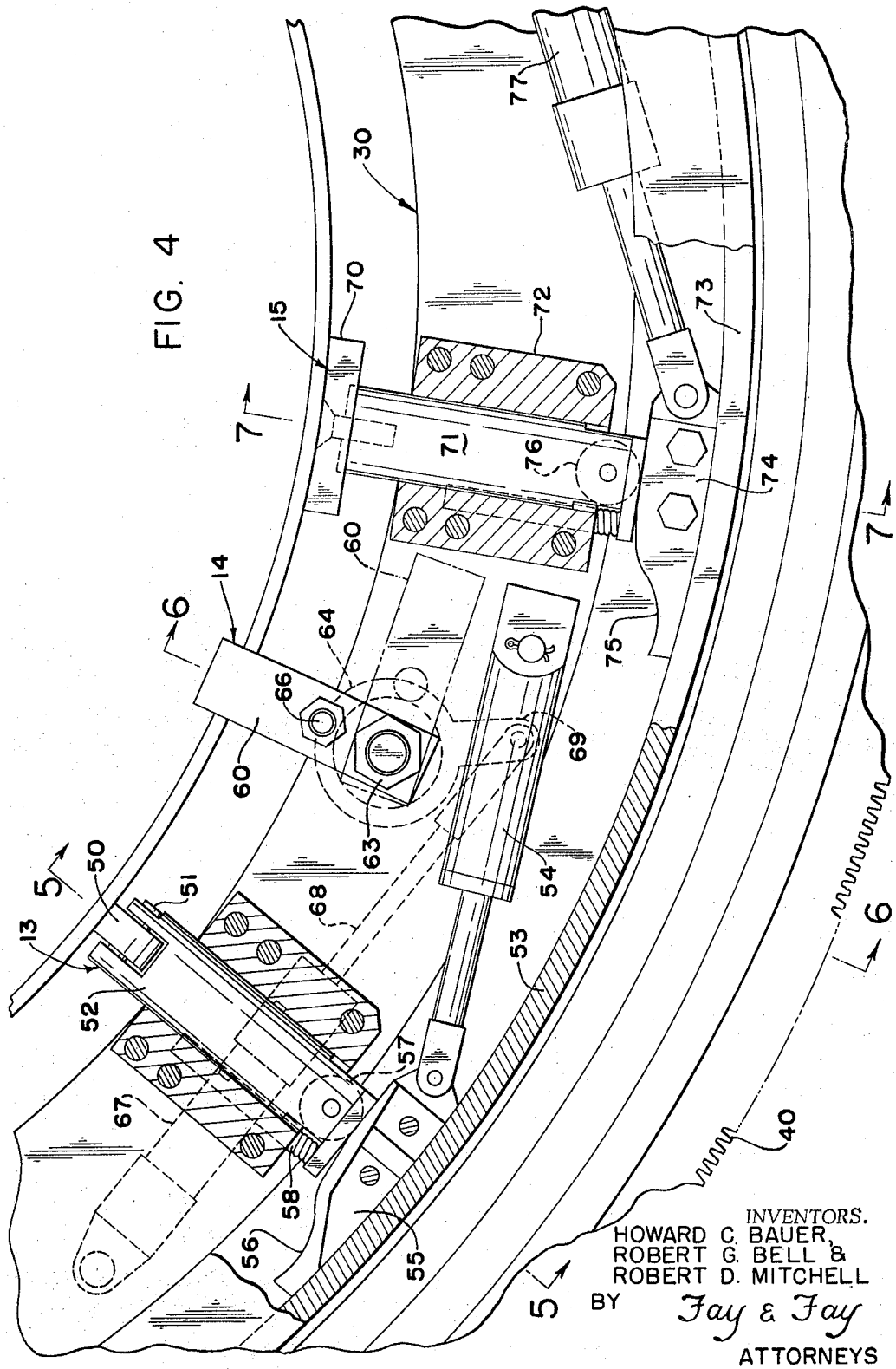

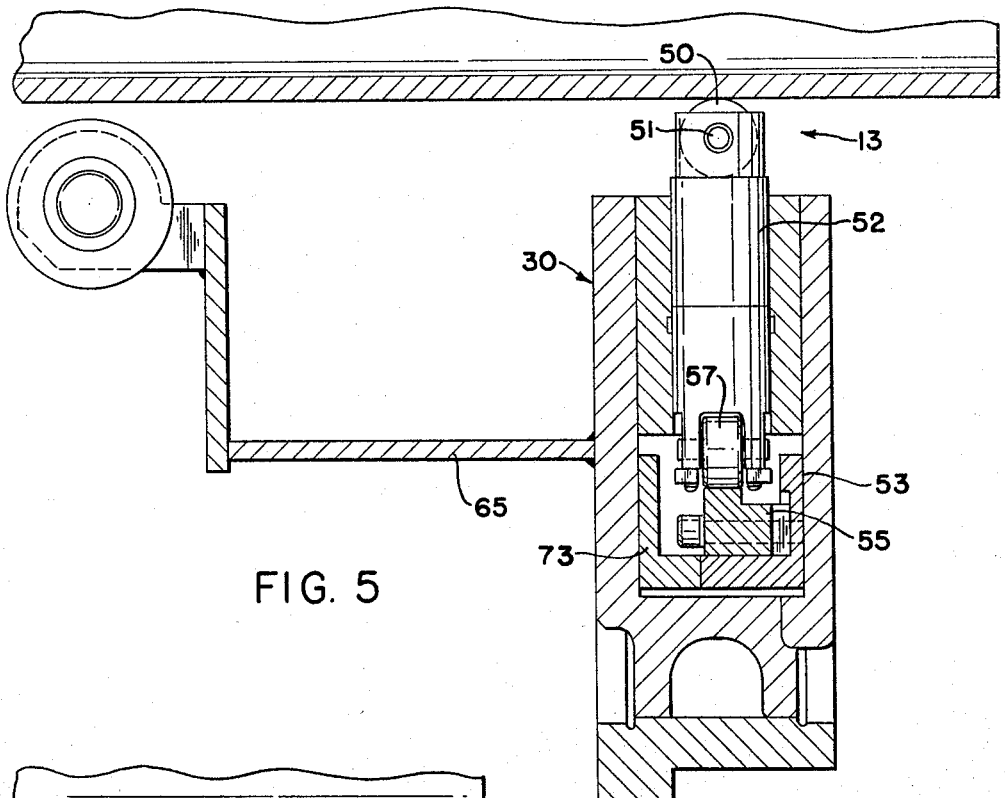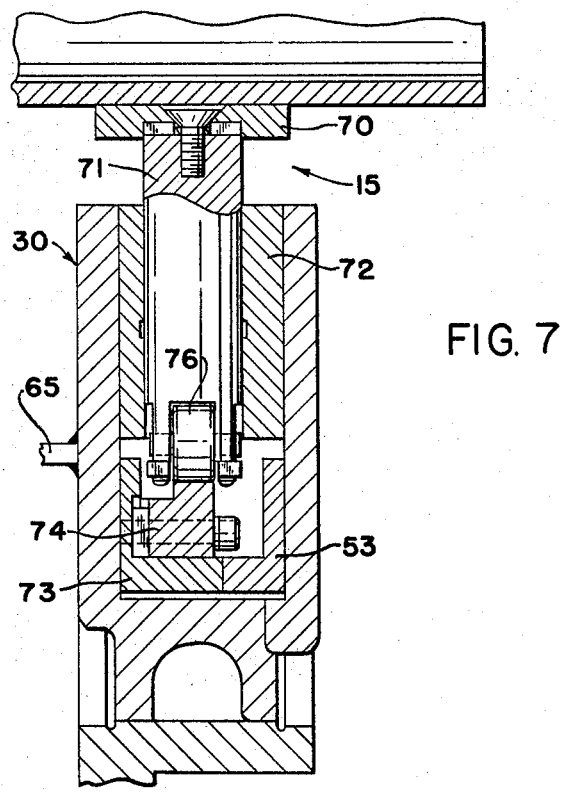

INVENTORS.
HOWARD C. BAUER,
ROBERT G. BELL &
ROBERT D. MITCHELL
BY *Fay & Fay*
ATTORNEYS

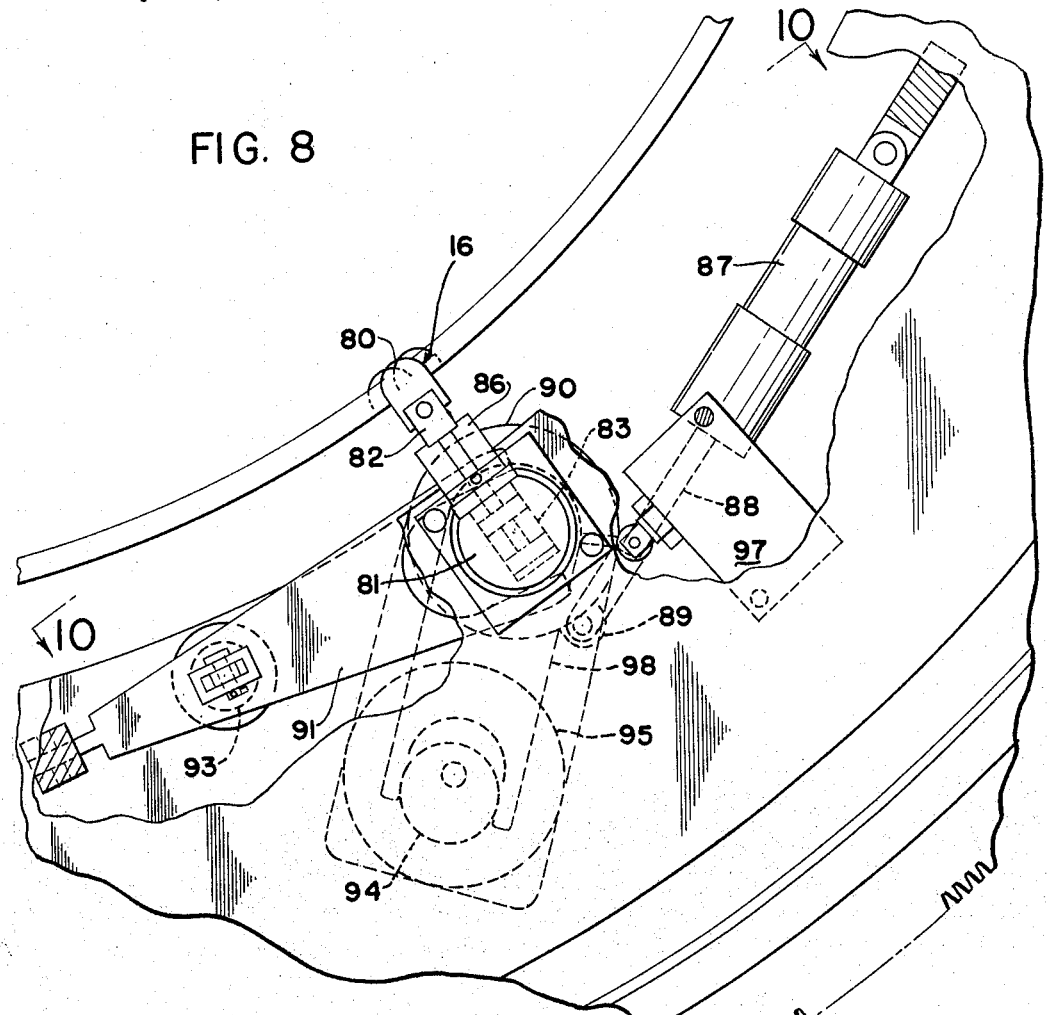
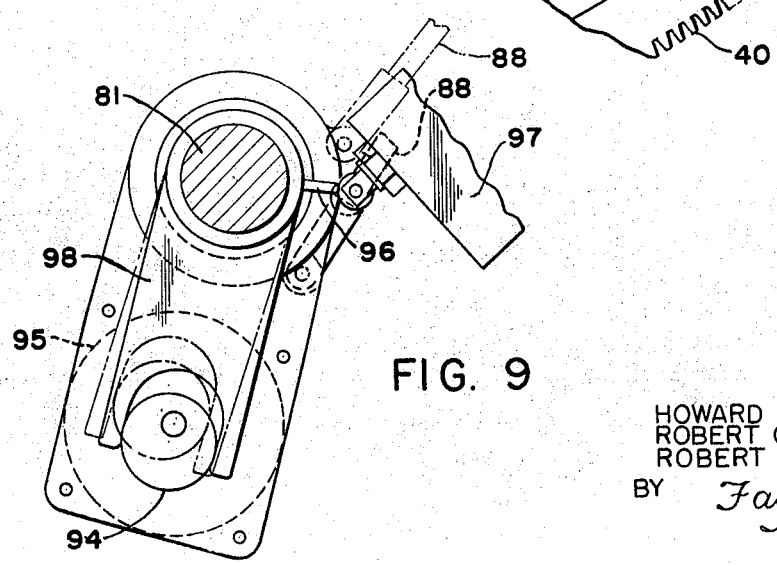

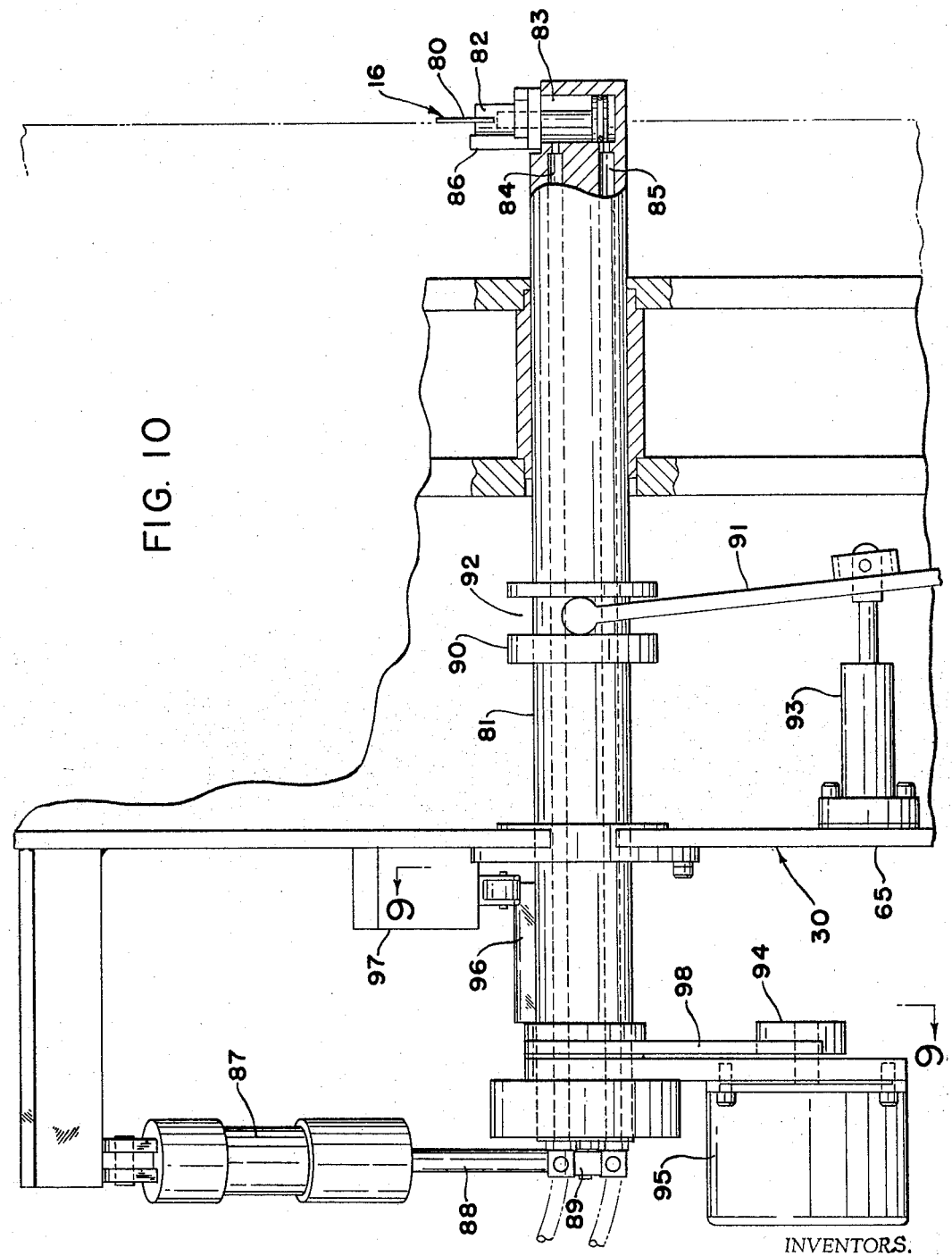

United States Patent Office 3,266,700
Patented August 16, 1966

3,266,700
PIPELINE WELDING ASSEMBLY
Howard C. Bauer, Bedford, Ohio, Robert G. Bell, Calgary, Alberta, Canada, and Robert D. Mitchell, Solon, Ohio, assignors to Bauer & Associates, Inc., Solon, Ohio, a corporation of Delaware
Filed Sept. 15, 1964, Ser. No. 396,554
21 Claims. (Cl. 228—5)

This invention broadly relates to a welding assembly for effecting the welding of elongated sections of pipe in end-to-end relationship.

It has become the practice in the pipeline industry to join adjacent sections of pipe by welding together the abutting ends of the sections. In recent years, means have been devised whereby this operation has been performed by a welding assembly mounted on a carriage, with the welding gun or head automatically welding around the pipe at the joint between the pipe sections thereby forming a welded joint. This welding operation has been performed substantially automatically and has proven to be a decided improvement over the previous method of hand welding the joints between pipe sections. However, for a truly automatic welding operation, it is desirable that subsidiary problems such as transportability of the welding apparatus, locating and orienting the welding head relative to the joint and orientation of the new section of pipe be overcome. By application of the principles of this invention, most of these problems have been resolved.

It is an object of this invention to provide a mobile automatic welding assembly.

It is another object of this invention to provide a welding assembly which is clamped to the pipeline prior to the welding operation.

It is a further object of this invention to provide means, in combination with a welding assembly, for accurately locating the welding assembly relative to the pipe joint prior to the welding operation.

Still another object of this invention is to provide a welding assembly which includes means for locating and clamping the welding head in position over the pipe joint.

A further object of the invention is to provide a mobile welding apparatus which is movable along a pipeline and which is capable of traversing curved sections of the pipeline.

A further object of the invention is to provide a mobile welding assembly which includes mechanism for attaching a section of pipe to a pipeline and which includes a spacing or gauging assembly to assure the proper spacing of the pipe section from the end of the pipeline for the welding operation.

A more specific object of the invention is to provide a welding assembly for joining a pipe section to a pipeline comprising in combination a mobile carriage supporting the welding assembly, a centering mechanism to orient the welding head relative to the center line of the pipe, a head locating mechanism to locate the welding head longitudinally of the pipe relative to the end of the pipeline, a clamping assembly to clamp the welding head in located position, and a gauging mechanism to space the end of the pipe section from the end of the pipeline.

To the accomplishment of the foregoing and related ends as well as other objects, advantages and features which will become apparent to one skilled in the art, the following description sets forth in detail one approved means of carrying out the invention. Such disclosed means are not meant to be limiting inasmuch as it constitutes but one of the various ways in which the principles of the invention may be applied.

In the drawings wherein like reference numerals indicate like parts in the various views:

FIG. 1 is a perspective view showing the welding assembly concentrically received over the end of a pipe section, FIG. 2 is a side elevation view of the assembly in position on a pipe section, FIG. 3 is a front elevation view with the welding and cutting heads removed, FIG. 4 is a partial section view of FIG. 3 showing the centering rollers, the locating arms and the clamping shoes, FIG. 5 is a view taken along line 5—5 of FIG. 4 and illustrates one of the centering rollers, FIG. 6 is a view taken along 6—6 of FIG. 4 and shows one of the locating arms, FIG. 7 is a view taken along line 7—7 of FIG. 4 and illustrates one of the clamping shoes, FIG. 8 is a partial sectional view of the device shown in FIG. 3 and illustrates one of the gauging devices, FIG. 9 is a view taken along line 9—9 of FIG. 10, FIG. 10 is a view taken along line 10—10 of FIG. 8 and illustrates the actuating mechanism for the gauging device.

Turning to the principles of the instant invention, there is shown in FIG. 1 an assembly, indicated generally by the reference numeral 10 which comprises the instant invention. This assembly includes, among other things, a mobile carriage 11 adapted to traverse the sections of pipe comprising the pipeline, a welding assembly including welding heads 12 supported by the carriage, centering means 13 and locating means 14 also supported by the carriage adapted to locate the welding heads relative to the end of the pipeline, a clamping mechanism 15 for securing the welding heads in position over the joint to be completed and a spacing device 16 adapted to space the pipeline from the section of pipe to be added. The assembly 10 also includes such accessory items as panelboard controls and other equipment needed to carry out the welding operation but these accessories comprise no part of the instant invention and are only shown schematically for purposes of completeness.

It will be understood that the assembly 10 is adapted to be received concentrically over a section of pipe, with wheels on the carriage 11 contacting the external surface of the pipeline thereby supporting the assembly for movement therealong. Appropriate means are provided for driving the assembly along the pipeline so that the unit may be moved to the situs where it is desired to attach additional sections of pipe to the line. Once the assembly has been brought to the point where a joint is desired, it is necessary to locate the welding head relative to the end of the pipeline, clamp the head in position, orient the new section of pipe with the end of the pipeline, clamp the new section of pipe in position, weld the joint between the adjacent ends of the pipe, release the clamps maintaining the assembly in position, and move the assembly along the newly added section of pipe to the next joint to be completed. The specific details of the welding heads and the clamps for securing the new section of pipe do not comprise any part of the invention and will, therefore, be discussed only in general terms as each relates to the overall combination. The remainder of the mechanism will be described in greater detail.

The carriage assembly

The carriage assembly is best viewed in FIGS. 1 and 2 and comprises a plurality of annular framing members 20 which are rigidly spaced apart by longitudinally extending reinforcement members 21. Rotatably supported on the reinforcement members 21 are a plurality of wheels 22, two of which are shown in FIG. 2 with a corresponding pair of wheels being provided on the opposite side of the carriage. Similarly, a pair of rollers 23 are carried by another longitudinal reinforcement member, with again only two being shown in FIG. 2 but it being understood that a corresponding pair of rollers is provided on the opposite side of the assembly. It is believed to be readily apparent that the carriage 11 is adapted to be received concentrically over a pipeline, with the wheels 22 and rollers 23 contacting the external surface of the line thereby providing mobility for the carriage and maintaining the framing members spaced from the pipeline.

The carriage 11 further includes an annular frame 24 comprising a head suspension assembly. The annular frame 24 includes a pair of spaced apart tubular members 24a, 24b. Appropriate reinforcing means secure the member 24a to the end framing member 20. At the top of the annular frame 24, there is provided a supporting beam 25. Attached at the outer extremity of the beam by a clamp 27 is a leaf spring 26. The leaf spring 26 is adapted to provide a resilient support for the welding and clamping devices to be described more fully hereinafter.

In general, an annular base member 30 has attached thereto arms at spaced positions around its circumference. The upper arms 31, 32 are attached to the ends of the spring 26 by rods 36, 37 which are threaded and provide a certain adjustability of the annular base member so that in its assembled position, it is substantially coaxial with the passageway through the carriage. The arms 33, 34, 35 are each attached to springs 38, with the opposite ends of each of the springs secured to brackets 39 carried by the annular frame 24. The springs 38 and 26 provide a floating mount for the annular base member 30 within the protective confines of the supporting frame 24. Such a resilient mounting of the base is necessary to assure the proper orientation of the base member relative to the center line of the pipe and also permit the traversing of curvatures in the pipeline.

Carried by the base member 30 and supported by brackets 41 are a pair of welding heads and cutter assemblies, generally indicated by the reference numeral 12. These welding heads are adapted to travel circumferentially of the annular base member 30 in applying a weld to a joint. The details of this welding and cutter assembly comprise no part of this invention and reference may be made to prior patents such as those to Rieppel et al., Nos. 3,084,244 and 3,084,246, both issued April 2, 1963 for a full disclosure of the specifics of a welding apparatus. In general, the welding heads include a cutter and are driven by a pinion 42 engaging with the gear 40. The pinion 42 is driven by a motor secured to the bracket 41 so that upon actuation of the motor, a cut is made by the cutter and the welder lays a bead joining the pipe ends.

The centering and locating mechanism

Prior to the operation of the welding heads 12, it is necessary to orient the annular base member 30 and thereby the welding heads relative to the end of the pipe line where the joint is to be made. In orienting the welding heads relative to the end of the pipeline two variables must be considered. First, the assembly must be centered radially with respect to the center line of the pipeline. In addition, the location of the assembly along the length of the pipeline must be such that the end of the pipeline may be gripped by a clamping mechanism to be described hereinafter and yet leave a sufficient length of the pipe exposed to permit the welding operation.

Turning to the specific mechanism for accomplishing this locating function and more particularly to the centering means 13, the annular base member 30 serves as a support for a plurality of rollers 50 which are adapted to engage the exterior surface of the pipeline. The rollers are spaced around the circumference of the annular base member 30 and provide a means for centering the base member relative to the center line of the pipeline.

Each of the centering rollers 50 is supported by a pin 51 carried in the end of push rod 52 which is slidably supported in the base member 30. The rollers 50 are supported by the push rods 52 in alignment with the longitudinal axis of the pipeline so that the base member 30 may be displaced longitudinally of the pipeline even after the centering operation has been completed.

To displace the push rods 52 to a position wherein the rollers 50 will engage the surface of the pipe, there is provided a cam ring 53 which is carried in an annular groove in the base member 30. The cam ring 53 is adapted to be rotated relative to the base member 30 by hydraulic cylinders 54 which are attached to the cam ring. There is a separate hydraulic cylinder associated with each of the centering rollers.

The cam ring also includes camming blocks 55. Each of these blocks includes a cam surface 56 which is adapted to cooperate with a roller 57 carried by the outer end of each of the push rods 52. A cam block is associated with each of the push rods and centering rollers 50 so that upon actuation of the hydraulic cylinders, rotation is imparted to the cam ring 53 which, in turn, displaces the cam blocks 55. As the cam blocks are rotated relative to the base member 30, each roller 57 rides up its corresponding cam surface 56 thereby causing a radially inward displacement of the associated push rod 52 until such time as the centering roller 50 is in firm engagement with the exterior of the pipe. Upon the venting of the hydraulic cylinders 54, the cam ring 53 is returned to its initial position and appropriate springs 58 associated with the push rods 52 return the centering rollers to a position spaced from the surface of the pipeline.

After the centering sequence has taken place, a second phase of locating the welding head consists of positioning the head relative to the plane of the end of the pipe. This is accomplished by the locating means previously generally indicated by the reference numeral 14.

In general, the locating means comprises a plurality of stop arms 60 which are carried by the base member 30. The stop arms are extended from the face of the base member to a point past the end of the pipeline whereupon the arms are rotated approximately 90° to bring them into line with the end of the pipe. After extension and rotation has occurred, the stop arms are then retracted causing the arms to engage the end of the pipe. Upon engagement of the arms with the pipe and upon continued retraction, the base member 30 is drawn along the surface of the pipe on centering rollers 50 until an appropriate stop mechanism is engaged.

More specifically and referring particularly to FIGS. 4 and 6, the stop arms 60 are normally in a position substantially parallel with the surface of the pipeline and thereby present no obstacle to the passage of the pipeline through the aperture in the base member 30. The stop arms 60 are carried on the end of a rod 61 which extends through an aperture and bushing 62 in the annular base member 30. Each arm 60 is attached by a bolt 63 to the end of a piston rod 61. Each piston rod is part of a hydraulic cylinder 64 carried by a bracket 65 supported on the base member 30. The cylinders 64 are of the non-rotating type in which the piston rod is restrained from rotation independent of the cylinder barrel. Appropriate inlet and outlet ports for the hydraulic fluid are provided in each cylinder 64 along with appropriate controls so that the pistons 61 may be extended and retracted simultaneously thereby causing the extension and retraction of the stop arms 60.

The innermost position of the stop arms 60 is determined by engagement of a stop screw 66 carried by the arms with the annular base member 30. The position of the stop screws may be adjusted so that the spacing of the stop arm 60 relative to the annular base member 30 may be varied depending on the spacing of the welding heads from the base.

Turning to FIG. 4, the operative position of the stop arm 60 is shown in the full line position with the stored or inoperative position of the stop arm being indicated in dotted lines. Normally, the stop arms are in the dotted line position. To rotate the stop arm 60 to the full line position shown in FIG. 4, a second hydraulic cylinder 67 is mounted on the annular base member 30. This cylinder includes a piston rod 68 which is extensible in the normal manner and attached at its outer end to a lever arm 69 secured to the barrel of the cylinder 64. The cylinder 64 is rotatably supported by the bracket 65 and the bushing 62 so that upon actuation of cylinder 67, rotation is imparted to the barrel of the cylinder and, thereby, the piston rod 61 thus effecting pivoting of the stop arm from the stored position to the operative position.

The operation of the locating means 14 is substantially as follows: Assuming the stop arm 60 to be positioned in the stored condition as illustrated in FIG. 4 and assuming it is desired to locate the welding heads relative to the end of the pipeline, the cylinder 64 would be actuated to extend the piston rod 61 and the attached stop arm 60 to a point beyond the end of the pipeline. At this point, the hydraulic cylinder 67 would be actuated causing rotation of the cylinder 64 and the stop arm 60 to the full line position shown in FIG. 4, with the stop arm aligned with the end of the pipe. In this position, the cylinder 64 would be actuated to retract the piston 61 causing the stop arm, and a wear plate 60a carried thereby, to engage the end of the pipeline. As the piston rod is retracted, the engagement of the stop arm with the end of the pipe will cause the entire assembly associated with the base member 30 to be displaced longitudinally of the pipeline on the centering rollers 50. This action will continue until such time as the stop screw 66 engages the base member 30 and the locating operation will have been completed. The reverse operation of the cylinders 64, 67 serves to return the locating arm 60 to the stored position. It is to be understood that the stop screw 66 is adjusted so that engagement of the stop screw with the base member 30 assures the proper positioning of the welding heads over the end of the pipeline.

*Clamping mechanism*

The centering and locating of the welding assembly by the centering rollers and locator arms completes the orientation of the mechanism preparatory to the welding operation. The next operation is the securement of the assembly in its located position to assure that external forces will not displace the assembly during the welding operation. The clamping mechanism to accomplish this function was previously indicated generally by the reference numeral 15 and is illustrated in FIGS. 3, 4 and 7.

The clamping mechanism 15 is similar in construction to the centering rollers and comprises a plurality of pads or shoes 70 which are adapted to engage the surface of the pipeline at spaced points about its periphery. The shoes are carried by the base member 30 and are attached to the end of push rods 71. The push rods 71 are movably carried by brackets 72 on the base member.

A second cam ring 73 which is adjacent to the cam ring 53 is supported by the base member. The cam ring includes cam blocks 74 having a cam surface 75, with a separate cam block associated with each of the push rods and shoes. The push rods 71 include rollers 76 adapted to engage the cam surface 75 as the cam ring 73 is rotated. The rotation of the cam ring 73 is controlled by hydraulic cylinders 77 which are equal in number to the number of shoes being used. As is apparent from FIGS. 5 and 7, the cam ring 73 is rotatable relative to the cam ring 53 so that both the centering rollers and the clamping shoes may be actuated separately.

The operation of the centering and clamping mechanism is substantially identical so that a further detailed description of the clamping mechanism is believed to be unnecessary. In this connection, it should be noted that both the centering device and the clamp mechanism are adaptable to a range of pipe sizes. Thus, if the need arises to weld a smaller diameter pipe, the shoes 70 may be replaced by shoes with a thicker section to compensate for the difference in radius. In similar fashion, an extension may be added to the push rods 52 to acomplish the same purpose with respect to the centering rollers.

Generally, the clamping of the pipeline by the shoes 70 occurs after the centering and longitudinal locating of the welding assembly has been completed but prior to the welding operation. In addition to the above described clamps, it is to be understood that an internal clamping mechanism would also be used to engage the interior surface of the pipe. However, such a mechanism is not part of this invention and it is believed to be sufficient simply to make reference to such devices which are generally understood by those having ordinary skill in the art.

*Spacing or gauging device*

With the welding assembly in position and clamped to the pipeline, there remains the positioning of a new section of pipe adjacent to the end of the line preparatory to the welding operation. Due to ordinary variations in dimensional tolerances, it is impractical to expect that the end of a section of pipe will coincide exactly with the end of the pipeline. Moreover, the ordinary welding mechanism is designed to operate with the respective ends of the pipes spaced apart approximately 0.060 inch. To space the ends of two pipes with any degree of accuracy is obviously impossible without the aid of special equipment. Therefore, the general practice has been to abut the new section of pipe with the end of the pipeline and then cut a gap of the optimum width and of uniform dimension at the joint between the pipe ends. Ordinarily, an abrasive grinding wheel or some other such cutter is utilized to perform this function. However, a certain amount of time is expended in this operation. In addition, the continual removal of substantial portions of pipe material causes rapid wearing of the cutting tool necessitating its periodic inspection, removal and replacement.

By the principles of this invention, there are provided means to space the pipes a small distance apart and then perform the cutting operation to assure the correct dimensional relationships. With the pipe ends spaced apart initially, less pipe material has to be removed and considerable time may be saved in the cutting operation. To make such a procedure practical, there is incorporated in the assembly a spacing or gauging device previously indicated generally by the reference numeral 16. As with the previous mechanisms discussed above, a plurality of the spacing devices 16 are carried by the base member 30. The details of the spacing device are best viewed in FIGS. 8, 9 and 10.

Turning first to FIG. 8, one of the spacing devices 16 is illustrated in greater detail. The spacing device basically comprises a feeler gauge or blade 80 which is designed to be interposed between the end of the pipeline and the end of the new section of pipe and thereby maintain a space of approximately .040″ between the two sections of pipe as they are lined up for welding. To accomplish this purpose, the gauge must be placed in a position between the two ends of the pipe and some means must be used to indicate when the proper spacing has been achieved. To accomplish this latter function, the feeler gauges are given an oscillating motion so that when the new section of pipe is properly positioned and spaced from the pipeline, the feeler gauge will be frictionally restrained by the ends of the two pieces of pipe. The cessation of the oscillating motion of the gauge is, by appropriate signaling means, indicated to the operator who will then know that the new section of pipe is properly spaced from the end of the pipeline. The feeler gauge thus has three essential actions—the first being similar to the action of the locating arms, that is, the rotation from a stored position to an operating position; the next is the extension of the feeler gauge to a position interposed between the ends of the pipe; and finally the oscillating motion of the feeler gauges until clamped between the ends of the two pipes.

The mechanism for accomplishing these motions includes a shaft 81 which is rotatably and slidably mounted on the base member 30. The shaft 81 carries at its outer end the feeler gauge 80 and its associated mechanism. The gauge 80 is attached to a piston rod 82 which is carried by a small hydraulic cylinder 83. Appropriate ports 84, 85 are provided through the shaft 81 to control the movements of the piston 82 in the cylinder 83. It is believed apparent that upon introduction of fluid pressure, the piston will be extended and thereby bring the feeler gauge to its working position. A guard 86 is provided on the end of the shaft 81 to protect the feeler gauge when it is in its inoperative retracted position.

The shaft 81 normally maintains the feeler gauge and its associated parts in a position similar to the stored position of the locating arms 60. To rotate the feeler gauge assembly from the stored position to an operative position, there is provided a cylinder 87 which is supported at one end on the base member. A piston rod 88 associated with the cylinder 87 and is connected to one end of a lug 89 secured to the shaft 81. As the rod 88 is extended, rotation is imparted to the shaft 81 thereby pivoting the gauge assembly into the operative position.

To place the gauge 80 over the end of the pipeline, the shaft 81 includes a saddle or collar 90 secured thereto. A shifting fork 91 is receivable in the groove 92 in the collar with the fork being actuated by appropriate means such as a hydraulic cylinder 93. Upon actuation of the cylinder, the shifting fork 91 will, through cooperation with the saddle 90, cause a longitudinal sliding motion to be imparted to the shaft 81 thereby extending the shaft to a position wherein the feeler gauge 80 overlies the end of the pipeline. The travel of the shaft 81 must be gauged such that at its outward extent, the feeler gauge is in alignment with the end of the pipeline.

In the extended position, the gauge 80 is still spaced radially from the pipeline. It is necessary, therefore, to extend the gauge 80 radially inwardly toward the center of the pipeline so that the gauge will be in a position to be clamped between the ends of the pipe. This is accomplished by the cylinder 83 in the manner above described.

With the gauge 80 disposed in position between the ends of the pipe, the new section of pipe may be moved into alignment with the end of the pipeline. As a means for signaling when the gauge 80 is clamped by the pipes, an oscillating motion is imparted to the gauge. This oscillating motion is imparted to the shaft 81 by a cam and follower mechanism indicated best in FIG. 9. Thus, a lever arm 93 is attached to the shaft 81, with the end of the arm having a bifurcated fork portion. An eccentrically mounted circular cam 94 is received in the fork defined by the bifurcation of the lever 93. The cam 94 is driven by a motor 95 carried by the base member. It is believed apparent that as the motor drives the cam 94, an oscillatory motion is imparted to the lever 93 which in turn oscillates the shaft 81 and thereby the gauge 80. Formed on the shaft 81 is a cam lobe 96. This lobe is adapted to engage a micro-switch 97 so that as the shaft 81 is oscillated, the micro-switch 97 is periodically actuated by the oscillation of the cam lobe 96. Through appropriate means the actuation of the micro-switch causes the flashing of a light on the panelboard 17, thus indicating to the operator that the feeler gauge is oscillating. When the feeler gauges are clamped between the ends of the pipes, the flashing lights will be discontinued so that the operator will be aware that the pipe has been positioned with the proper space from the end of the pipeline. Thus, the gauges 80 together with the oscillatory mechanism and the switch mechanism comprise a means for measuring the spacing between the end of one pipe section and the end of an adjacent pipe section.

It is to be noted in connection with the spacing mechanism that additional or alternative means may be used to accomplish the various mechanical movements described. Thus, in lieu of the shifting fork and collar, the shaft 81 could be a piston which was a part of a hydraulic cylinder so that the extension of the gauge mechanism could be accomplished by actuation of the cylinder. In addition, the eccentric cam and bifurcated lever 93 could be replaced by alternative mechanisms for accomplishing the oscillation of the shaft 81. The principle features of the spacing device are the mechanisms for accomplishing the rotation of the device to a working position from the stored position, the extension of the gauging device to a point over the end of the pipeline, the subsequent extension of the feeler gauge to a position in alignment with the end of the pipeline and the oscillation thereof to accomplish the signaling function above described.

With the new section of pipe properly spaced from the end of the pipeline, the feeler gauge 80 will be clamped between the ends of the pipe. However, the hydraulic pressure which extended the feeler gauges is capable of withdrawing the feeler gauges from this clamped position and this is accomplished followed by retraction of the gauge device to the stored position. Assuming the new section of pipe has been clamped in this gauged position, the cutting of the uniform gap and the application of weld material to the joint may then commence.

As will be apparent to those having ordinary skill in the art, certain of the features and subcombinations hereinabove described may be utilized separate and apart from other features and combinations. The separate utility of such features and subcombinations is intended to come within the scope of this invention. Moreover, additional modifications and changes of the combination and the subcombinations will suggest themselves to those having ordinary skill in the art. Changes such as these are contemplated by the principles of the invention so that although for ease of description, the principles of the invention have been set forth in connection with but a single illustrated embodiment, it is not intended that this illustrated embodiment or the terminology employed in describing it is to be limiting, but rather, it is our desire to be restricted only by the scope of the appended claims.

We claim:

1. In combination, a welding assembly for securing adjacent ends of pipe in end-to-end relation and including a base member adapted to be received concentrically over a piece of pipe,
   welding means secured to said base member,
   centering means on said base member adapted to center said base member on said pipe,
   locating means on said base member for locating said base member and said welding means in a predetermined spaced relation from the end of said pipe,
   clamping means on said base member for securing said base member to said pipe, and
   spacing means on said base member adapted to space an additional piece of pipe from said one piece of pipe to facilitate the welding of the joint therebetween.

2. In combination,
   an assembly for welding circumferential joints between adjacent aligned cylindrical pipe sections comprising a base member adapted to be received concentrically over one of the sections of pipe,
   welding means secured to said base member,
   means on said base member for centering said base member on said one section of pipe relative to the longitudinal axis thereof,
   means carried by said base member for securing said member to said one section of pipe a predetermined distance from the end thereof,
   and spacing means on said base member operative to space an aligned pipe section from the end of said one section of pipe a predetermined distance to facilitate the welding thereof.

3. In combination,
   an assembly for welding adjacent sections of cylindrical pipe comprising, a base member adapted to be received concentrically over one of the sections of pipe, means supporting said base member on said section of pipe for engagement with and movement along the surface of said one section of pipe, means carried by said base member for securing said member to said section of pipe a predetermined distance from the end thereof, and spacing means on said base member operative to space an aligned pipe section from the end of said one section of pipe a predetermined distance prior to the welding thereof.

4. Apparatus for welding circumferential joints between adjacent aligned cylindrical pipe sections comprising a carriage adapted to be received concentrically over one of the sections of pipe, means supporting said carriage on said section of pipe for movement therealong, an annular base member coaxial with said carriage and adapted to be received concentrically over said section of pipe, resilient means supporting said base member on said carriage, welding means movably supported on said base member, and means on said base member operative to align said welding means with the end of said section of pipe preparatory to the welding thereof.

5. The apparatus of claim 4 and including spacing means on said base member operative to space an aligned section of pipe from the end of said one section of pipe.

6. The apparatus of claim 4 wherein said aligning means includes means for centering said base member on said section of pipe relative to the longitudinal axis thereof.

7. The apparatus of claim 5 and including clamping means adapted to secure said base member to said section of pipe.

8. In combination with apparatus for welding circumferential joints between adjacent aligned cylindrical pipe sections, which apparatus includes a carriage adapted to be received concentrically over one of the sections of pipe; an annular base member coaxial with the carriage and adapted to be received concentrically over said one section of pipe; and welding means movably supported on the base member; the combination further including;

a plurality of clamping means adapted to engage the exterior of said one section of pipe;

said clamping means including a plurality of circumferentially spaced shoes;

push rods secured to each of said shoes;

an annular cam ring rotatably carried by said base member;

said cam ring including a plurality of cam surfaces with a cam surface being associated with each push rod; and means carried by said base member operable to rotate said cam ring whereby the engagement of said cam surface with its associated push rod displaces said push rod and its associated shoe radially inwardly into engagement with the surface of said one section of pipe thereby to clamp the apparatus to said pipe.

9. The combination of claim 8 and further including; spring means associated with said push rods normally biasing said push rods in a radial direction away from said one section of pipe and into engagement with said cam surface on said cam ring.

10. In combination with apparatus for welding circumferential joints between adjacent aligned cylindrical pipe sections, which apparatus includes a carriage adapted to be received concentrically over one of the sections of pipe; a base member coaxial with said carriage and adapted to be received concentrically over said section of pipe; means supporting said carriage on said pipe for movement therealong and welding means carried by said base member; said combination further including;

locating means on said base member operable to align said welding means with the end of said section of pipe;

means mounting said locating means for movement between a normally inoperative position and a normally operative position;

said locating means having a portion thereof adapted to engage the end of said pipe section in the operative position;

operating means associated with said locating means;

said operating means being operable when said locating means is in the operative position to engage said portion of said locating means with the end of said section of pipe and thereby move said carriage along the section of pipe until said welding means is aligned with the end of said pipe section.

11. The combination of claim 10 wherein said locating means comprises a plurality of extensible arms carried by said base member;

said extensible arms being parallel to the longitudinal axis of said base member and each including a stop member secured at one end thereof transverse to the longitudinal axis of said extensible arm;

each extensible arm being carried by said base member for rotatable and longitudinal movement;

means operable to rotate said arm between a stored position wherein said stop member is displaced from the plane of said section of pipe and an operative position wherein said stop member is directed radially inwardly toward said pipe; and actuating means operable to extend each of said arms to a first position wherein said stop member is extended beyond the end of said section of pipe and being further operable to retract said stop member to a second position in abutment with the end of said pipe section whereby further retraction of said arms causes a corresponding movement of said carriage relative to said pipe.

12. In combination with apparatus for welding circumferential joints between adjacent aligned cylindrical pipe sections, which apparatus includes a carriage adapted to be received concentrically over one of the sections of pipe, wheel means on said carriage adapted to engage the periphery of said pipe and an annular base member coaxial with the carriage and adapted to be received concentrically over said one section of pipe with resilient means supporting said base member on said carriage, the combination further including:

a plurality of centering means circumferentially spaced on said base member;

each of said centering means including a reciprocally mounted push rod;

an annular cam ring rotatably carried by said base member;

said cam ring including a plurality of cam surfaces with a cam surface being associated with each push rod;

roller means on the radially inner end of each of said push rods;

means carried by said base member operable to rotate said cam ring whereby the engagement of said cam surface with its associated push rod displaces said push rod and its roller radially inwardly into engagement with the surface of said pipe section;

the circumferential spacing of said centering means being such that said base member is centered on said pipe when there is engagement between the rollers and said pipe.

13. The combination of claim 12 and further including:

a plurality of clamping means circumferentially spaced on said base member and adapted to engage the exterior of said one section of pipe;

said clamping means including a plurality of clamping shoes;

a push rod secured to each of said shoes;

an annular cam ring rotatably carried by said base member adjacent to said first mentioned cam ring;

said latter cam ring including a plurality of cam surfaces with a cam surface associated with each of said latter mentioned push rods;

and means carried by said base member operable to rotate said latter cam ring thereby to displace said push rod and its associated shoes in the clamping engagement with the surface of said pipe.

14. In combination with apparatus for welding circumferential joints between adjacent aligned cylindrical pipe sections, which apparatus includes a base member adapted to be secured to one of said pipe sections with welding and cutting means movably supported on the base member, the combination further including:

spacing means movably supported on said base member;

said spacing means being radially movable inward of the outer periphery of said one pipe section to a position overlapping the end wall section of said one pipe section and including means for measuring the spacing between the end of said one section and the end of an adjacent pipe section.

15. The combination of claim 14 wherein said spacing means includes:

a plurality of circumferentially spaced arms carried by said base member;

the longitudinal axis of each arm being parallel to the longitudinal axis of said sections of pipe;

means mounting each arm on said base member for rotary movement relative thereto;

a spacing gauge secured to the outer extremity of each arm; and means associated with each arm operable to impart rotary vibratory movement to said arms.

16. The combination of claim 15 including means mounting each of said spacing gauges on its associated arm for movement between a stored position and an operative position.

17. The combination of claim 15 and including means carried by said base member and connected to said arms operable to displace said arms relative to said base member longitudinally of the axis of said sections of pipe.

18. In combination with apparatus for welding circumferential joints between adjacent aligned cylindrical pipe sections, which apparatus includes a base member adapted to be secured to one of said pipe sections with welding means movably supported on the base member operable to travel circumferentially of the pipe joint; the combination further including:

a plurality of spacing gauges on said base member in circumferentially spaced apart relation;

each of said gauges being adapted to be interposed between the adjacent ends of aligned pipe sections; and vibrating means carried on said base member operative to impart a vibratory motion to said gauges;

light signalling means on said base member;

switch means on said base member adapted to energize said light means;

switch actuating means carried by said gauge means operable to actuate said switch means;

said switch actuating means periodically actuating said switch means as said gauge means is vibrated thereby to cause periodic energization of said light means.

19. In combination with apparatus for welding circumferential joints between adjacent aligned cylindrical pipe sections, which apparatus includes a carriage adapted to be received concentrically over one of the sections of pipe; wheel means on said carriage adapted to engage the periphery of said pipe and an annular base member coaxial with the carriage and adapted to be received concentrically over said one section of pipe with resilient means supporting said base member on said carriage; the combination further including:

a plurality of locating means circumferentially spaced on said base member;

each of said locating means including a reciprocally mounted rod having a longitudinal axis parallel to the axis of said pipe;

means on said base member adapted to displace each rod lonigtudinally and further means carried by said base member adapted to impart rotation to each rod;

stop means carried by the end of each rod adapted to engage the end of said pipe section;

each of said rods being rotatable from a first position wherein said stop means is radially spaced from the end of said pipe to a second position wherein said stop means is aligned with the end of said pipe whereby in said second position the retraction of said rods causes engagement between said stop means and the end of said pipe section resulting in the movement of said carriage on said wheel means to a position overlying the end of the section of pipe.

20. A method of welding a circumferential joint between adjacent aligned cylindrical pipe sections with a welding apparatus which includes a carriage adapted to be received concentrically over one of the sections of pipe; wheel means on said carriage adapted to engage the periphery of said pipe; and an annular base member supporting movable welding means thereon comprising the steps of:

placing the carriage in concentric relation over one section of pipe;

moving the carriage along the section of pipe to a position adjacent the end of the section of pipe;

centering the base member and welding means on the pipe section;

locating the welding means relative to the plane of the end of the pipe section by moving the base member until the welding means is in alignment with the plane of the end of the pipe section;

clamping the welding means in centered and located position to the pipe;

aligning the second section of pipe with the end of the first mentioned section of pipe;

spacing the end of the second section of pipe a predetermined distance from the end of the first section of pipe;

cutting a predetermined gap between the aligned ends of the pipe sections; and applying a circumferential weld around the adjacent ends of the pipe sections.

21. The combination of claim 14 wherein said spacing means includes;

means for imparting rotary oscillating movement to said spacing means.

References Cited by the Examiner

UNITED STATES PATENTS 3,084,244 4/1963 Rieppel et al. _____ 219—60.1
3,084,246 4/1963 Rieppel et al. _____ 219—60.1

FOREIGN PATENTS 944,451 12/1963 Great Britain.

JOHN F. CAMPBELL, *Primary Examiner.*

M. L. FAIGUS, *Assistant Examiner.*